United States Patent [19]

Béchet et al.

[11] Patent Number: 4,773,752
[45] Date of Patent: Sep. 27, 1988

[54] STABILIZED SIGHTING APPARATUS

[75] Inventors: Pierre Béchet, Rueil Malmaison; Jean Picard, Versailles, both of France

[73] Assignee: Societe d'Applications Generales d'Electricite, France

[21] Appl. No.: 126,169

[22] Filed: Feb. 20, 1980

[30] Foreign Application Priority Data

Feb. 20, 1979 [FR] France ............... 79 04279

[51] Int. Cl.$^4$ ............... G01C 3/08; G01J 1/00
[52] U.S. Cl. ............... 356/5; 89/41.06; 250/342; 250/347
[58] Field of Search ............... 89/41 L, 41.06; 244/3.16, 3.12; 250/339, 342, 347, 353; 356/4, 5, 152

[56] References Cited

U.S. PATENT DOCUMENTS

| | | | |
|---|---|---|---|
| 3,464,757 | 9/1969 | Schmidt et al. | 250/353 |
| 3,519,829 | 7/1970 | Pradel et al. | 356/4 |
| 3,539,243 | 11/1970 | Scidmore | 89/41 L |
| 3,743,217 | 7/1973 | Turck | 244/3.16 |
| 3,989,947 | 11/1976 | Chapman | 244/3.16 |
| 3,997,762 | 12/1976 | Ritchie et al. | 89/41 E |
| 4,108,551 | 8/1978 | Weber | 356/5 |

Primary Examiner—Stephen C. Buczinski
Attorney, Agent, or Firm—Larson and Taylor

[57] ABSTRACT

A stabilized sighting apparatus comprising a infrared camera sensitive to the thermal infrared rotatably mounted for rotation about an elevation axis on an assembly rotatable on a platform about an azimuth axis. The camera is provided with an inertial system for stabilization about the two axes. The apparatus comprises an optical viewfinder having an aiming mirror mounted on the assembly and rotatable about an axis parallel with the elevation axis by a recopying device and an optical offset means which directs along the azimuth axis, towards the platform, the light beam reflected by the aiming mirror. The infrared camera is traversed by the azimuth axis and the larger part thereof is on the side of the azimuth axis opposed to the side where the mirror is located.

9 Claims, 1 Drawing Sheet

STABILIZED SIGHTING APPARATUS

BACKGROUND AND SUMMARY OF THE INVENTION

The present invention relates to stabilized sighting apparatus and is particularly but not exclusively suitable for use in fire control systems located on movable platforms, particularly land vehicles, helicopters and boats. There exist fire control systems designed to maintain the elevation and azimuth angles of the lines of sight of several units operating in different wavelength fields, such as a direct observation sighting telescope, a TV camera working in the visible or near infrared portion of the electromagnetic spectrum, a deviation detecting device, a thermal-imaging apparatus. The lack of material having a satisfactory transmission coefficient in the whole of the useful spectrum, from visible light to thermal infrared, has frequently led to use of at least two separate apparatuses to cover the whole of the spectrum, one being typically provided for the 0.4 to 2.5 micron field and the other for the 4 to 14 microns field.

It is an object of the invention to provide a multiwave sighting apparatus, which is of acceptable overall size and reduced in weight and whose aiming stability is comparable to those of prior apparatuses.

According to the invention, there is provided a stabilized sighting apparatus comprising a structure mounted for rotation about a first axis on an assembly mounted for rotation about a second axis orthogonal to the first on a platform, a thermal infra-red camera carried by the structure, inertial means carried by said structure for controlling drive means associated with the structure and assembly for stabilization about the two axes, optical sight means having an aiming mirror mounted on said assembly for rotation about an axis parallel to said first axis, drive means drivably connected to said mirror for impressing angular movements to said mirror reproducing the movements of the camera, and optical means for transferring a light beam received from the mirror toward the platform at a location close to the second axis, said infrared camera being so located as to be traversed by the second axis and the larger portion thereof being opposite the mirror in relation to said second axis.

The inertial system is advantageously fast with an elevation ring supporting directly the camera for maximum stability.

An harmonizing collimator and associated reflectors directing light towards the camera and towards the mirror may be connected to the elevation ring; with such a system, it is possible to measure a possible angle between the lines of sight of the different detection units in relation to each other, at any moment and whatever the aiming angles. The harmonizing system connected to the supporting structure of the gyroscope and therefore stabilized may additionally be associated with an electronic circuit which delivers data representative of dynamic structural deformation if any; such deformation may then be taken into account so as to improve the stabilizing performances.

If the collimator is only used for harmonizing, reflectors may be provided with means for retracting them by rotation in order to avoid constant occultation of the pupils of the associated optical elements, such as the TV camera and the aiming mirror.

By substituting a recopying device with a ratio ½ for the stabilizing system usually provided for the aiming mirror, the weight, bulk and cost of the assembly is substantially reduced. This is without attendant disadvantage when the visible image is directly observed by an operator since the required aiming stability is smaller than in the case where a camera is used, given the possibilities of adaptation and of interpretation of the human eye.

The assembly rotatable about the second axis may be formed by an azimuth ring which supports, in addition to the aiming mirror, a Galilean telescope with variable magnification and a dichroic separator. On leaving the separator, the visible part of the light spectrum is reflected by optical displacement means to be directed along the second axis whereas the infra red portion is sent towards a rangefinding system also supported by the azimuth ring.

Such an arrangement presents numerous advantages: by placing the Galilean telescope directly behind the mirror, the size of the mirror and of the transparent window for the visible portion of the spectrum may be reduced and consequently the size of the apparatus.

The invention will be better understood from the following description of a particular embodiment thereof, given by way of example. The description refers to the accompanying drawings.

SHORT DESCRIPTION OF THE DRAWINGS

DETAILED DESCRIPTION OF AN EMBODIMENT

Figure 1:
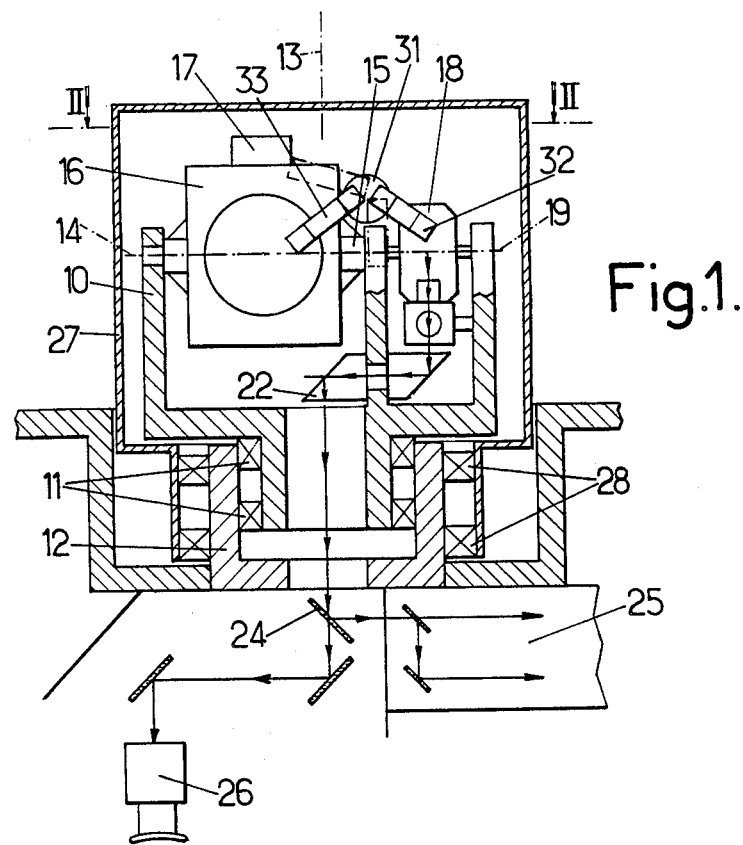
FIG. 1 is a simplified diagram showing the main components of the apparatus, in cross section, along a plane passing through the second axis.

The apparatus as shown comprises a ring 10 for azimuthal angular movement, mounted by means of low-friction pre-stressed bearings 11, on a sleeve 12 which is a portion of a supporting platform. Ring 10 forms the main element of an assembly rotatable about the azimuth orientation axis 13. It comprises a fork provided with bearings defining an elevation orientation axis 14 of a ring 15 to which is secured a camera whose sensitivity field extends into the thermal infrared, typically from 4 to 13 microns. Infra red camera 16 or ring 15 supports the sensors 17 of an inertial system for stabilization about axes 13 ans 14. The sensors may comprise a dry 2-axes gyro, associated with conventional electronics to control torquers associated with rings 10 and 15.

The camera is connected, through sliding electrical joints if it is desired to provide an unlimited range of azimuthal rotation, to display means placed on the platform.

Figure 2:
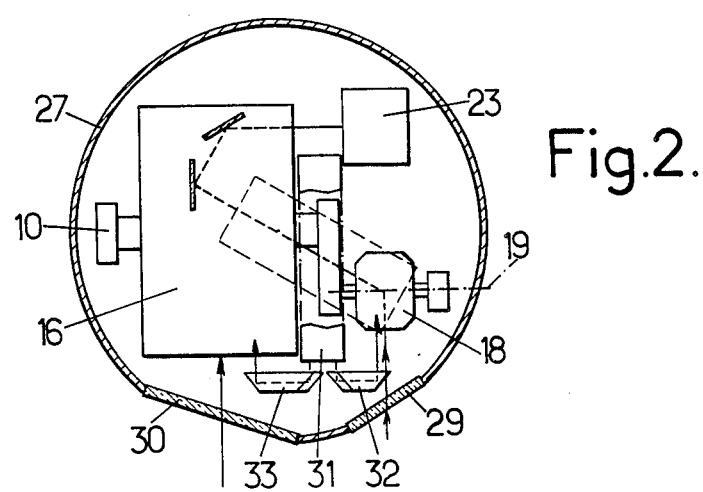
FIG. 2 is a cross-sectional view along line II—II of FIG. 1.

The camera 16 constitutes the input member of a first way into the apparatus. A second way comprises an aiming and orientation mirror 18 rotatable in bearings carried by azimuthal ring 10. The bearings are arranged for rotation of the mirror about an axis 19 parallel to axis 14 (FIG. 2). Mirror 18 has no independent stabilizing system: it is controlled from 10 by means of an angular reduction system which has substantially no lost motion, for example consisting of pulleys and a metal belt. The azimuthal angular movement is provided by ring 10.

The second way comprises, directly after the mirror 18, a Galilean telescope 20 which may provide several magnifications and several fields, typically two. The light beam from telescope 20 is taken up by means for lateral displacement of the beam, which direct it along axis 13. In the embodiment as shown, the optical means comprises a dichroic rhombohedron prism 22 which splits the incident beam into two parts. When the second way is provided for receiving the radiation in the visible and near infrared spectrum up to 2.5 microns, the rhombohedron may be provided to direct the visible wave lengths of the beam and up to 1.06 micron along axis 13.

The beam transmitted by rhombohedron 22 may be processed by a rangefinding or deviation-measuring device 23 (FIG. 2) supported by the azimuth ring 10. It may in particular be a rangefinder using a laser in the near infrared or a deviation-measuring device or ecartometer; such a device may use a scope with raster scan or strips of light sensitive diodes having a sensitivity peak at about 2 microns.

The beam sent along axis 13, if it has not already been split into two, may be split on the platform by a new dichroic blade 24 so as to provide a beam directed towards a rangefinder or deviation measuring device 25 (FIG. 1) and a beam directed to an eye-viewing telescope 26. Instead of a telescope, another day light viewing system may be provided, for example a TV camera.

The components which have just been described may be placed in a protecting cover or housing 27, supported by bearings 28 for rotation about the lateral deflection axis 13. Cover 27 will be driven so as to follow the movements of the azimuth ring 10. It is provided with input windows, having a vertical length sufficient to authorize entry of light throughout the angular aiming range provided for camera 16 and mirror 18. When the apparatus is designed to be located on the roof of a vehicle, as shown in FIG. 1, the required elevation range will be frequently of from +85° to about −30°. The window for camera 16 will typically be of germanium, for being consistent with the spectrum of sensitivity of such a camera, typically from 5 to 13 microns. Window 29 opposite mirror 18 will be made from glass or better still from quartz when it must be transparent to the infrared spectrum up to about 2.5 microns.

The most cumbersome component inside cover 27 is camera 16. The cross-section of the latter will practically fill one side of the cross-sectional area of the cover and will extend into the other side. Mirror 18 and the rangefinding or deviation-measuring device 23 may then be placed one behind the other, along a side of camera 16. Referring to FIGS. 1 and 2, a harmonizing collimator 31 is carried by the elevation ring 15 and associated with reflectors 32 reflecting towards mirror 33 and towards camera 16.

Mirror 33 is supported by a mechanism (not shown) for moving it from the active position illustrated in full lines to a retracted position shown in dash-dot lines.

The harmonization collimator is for providing an index which can be identified in a spectrum which overlaps the wave length ranges of camera 16 and telescope 20. The reflectors 32 and 33 deliver the index to the camera and to the telescope. It is then possible to measure and then to correct the deviation or drift which may exist between the sighting lines of the camera and telescope. That deviation can for instance be automatically measured when the sighting line of camera 16 is in coincidence with the index of the self collimator 31 carried by the ring 15. After it has been measured, the deviation may be compensated with an harmonization system including mechanical adjustment means and an actuating electronic system (not shown).

The camera sensitive to the thermal infrared is stabilized directly and benefits from the natural stabilization caused by the inertia of the whole of the components, at least as regards azimuthal deflection since the cover follows up the azimuthal movement, the aerodynamic torques and friction torques which would be caused, in its absence, by the required sealing joints are avoided.

By way of example, an apparatus for operation in the lower atmospheric layers is formed in the following way; camera 16 is of the thermal type, operates in the 8 to 13 micron band and has two or three fields selectable by the operator. The Galilean telescope 20 has a ¼ magnification. The rhombohedron or the dichroic blade separates the part of the spectrum up to 1.06 micron from that from 2.2. microns, which represents a good compromise between immunity to solar radiation and immunity to thermal radiation. The rangefinder may be of the laser type operating at 1.06 micron whenever the targets to be followed are travelling at low speed. Finally, the torquers driving the azimuth ring 10 and the elevation ring 15 may be commercially available torque motors.

Numerous modified embodiments are possible.

The apparatus may be designed for nose mount, location in an external pod or mast mount on a helicopter. In the first two situations, bearings 11 and 28 will be generally disposed on each side of ring 10 and of cover 27 rather than on the same side.

We claim:

1. A stabilized sighting apparatus comprising a structure mounted for rotation about a first axis on an assembly mounted for rotation about a second axis orthogonal to the first on a platform, a thermal infrared camera carried by the structure and secured thereto, inertial means carried by said structure for controlling drive means associated with the structure and assembly for stabilization of the structure about the two axes, optical sight means having an aiming mirror mounted on said assembly for rotation about an axis having the same direction as said first axis, drive means drivably connected to said mirror for impressing angular movement to said mirror reproducing the movements of the camera with an angular reduction ratio of one-half, and optical means for transferring a light beam received from the mirror toward the platform at a location close to the second axis, said infrared camera being so located as to be traversed by the second axis and the larger portion thereof being opposite the mirror in relation to said second axis.

2. Apparatus according to claim 1, wherein the first and second axes are elevation and azimuth axes and wherein the assembly comprises an azimuthal ring provided with bearings defining the first axis, which forms the elevation axis.

3. Apparatus according to claim 2, wherein the inertial means is fast with an elevation ring which carries the infrared camera.

4. Apparatus according to claim 1, wherein the aiming mirror is operatively associated with a Galilean telescope supported by said assembly for the light beam reflected by the mirror to be received by the Galilean telescope.

5. Apparatus according to claim 4, wherein said assembly has a dichroic separator separating the beam coming from the Galilean telescope into a visible light beam which is directed substantially along said second axis and a beam in the near infrared which is directed to a rangefinding system fast with said assembly.

6. Apparatus according to claim 1, which further comprises a housing rotatable about said second axis, surrounding the camera and the aiming mirror, provided with transparent windows whose size is adapted to the fields of angular movement of the camera and the aiming mirror about the first axis.

7. Apparatus according to claim 6, wherein the window associated with the camera is transparent to thermal infrared from 5 to 13 microns, whereas the window associated with the mirror is transparent to the visible and infrared up to 2.5 microns.

8. Apparatus according to claim 3, further comprising an harmonization collimator carried by the elevation ring followed by reflectors for sending back the incident light from the harmonization collimator to the mirror, and to the infrared camera.

9. Apparatus according to claim 8, wherein at least one of the reflectors is movable between an operative position and an inactive position where it clears the field of view of the associated mirror or infrared camera.

* * * * *